United States Patent [19]
Hall et al.

[11] Patent Number: 4,562,744
[45] Date of Patent: Jan. 7, 1986

[54] METHOD AND APPARATUS FOR MEASURING THE FLOWRATE OF COMPRESSIBLE FLUIDS

[75] Inventors: Kenneth R. Hall, College Station; James C. Holste, Bryan, both of Tex.

[73] Assignee: Precision Measurement, Inc., Dallas, Tex.

[21] Appl. No.: 607,280

[22] Filed: May 4, 1984

[51] Int. Cl.$^4$ .............................................. G01F 1/36
[52] U.S. Cl. ................................ 73/861.02; 73/861.61
[58] Field of Search .......... 73/861.02, 861.03, 861.01, 73/861.61, 861.62, 861.63, 861.64, 115, 117.4; 364/510

[56] References Cited

U.S. PATENT DOCUMENTS 3,701,280 10/1972 Stroman ............................ 73/861.02
4,419,898 12/1983 Zanker ............................. 73/861.02

Primary Examiner—Donald O. Woodiel
Attorney, Agent, or Firm—Thomas L. Cantrell

[57] ABSTRACT

The flowrate of a compressible gas is determined by measuring the pressure and temperature on each side of a flow impedance device, such as an orifice plate and computing the flowrate from the resulting pressure and temperature differentials according to a newly discovered orifice equation disclosed herein. The flowrate determined in accordance with the invention is more accurate than that calculated by using the standard orifice equation, which ignores the temperature differential. In addition, the calculation is independent of the type of flow impedance used and is not affected by degradation of the impedance device, such as the erosion of the orifice in orifice plates.

11 Claims, 2 Drawing Figures

METHOD AND APPARATUS FOR MEASURING THE FLOWRATE OF COMPRESSIBLE FLUIDS

BACKGROUND OF THE INVENTION

This invention relates to the measurement of the rate of flow of fluid, and more particularly to the measurement of the rate of flow of a compressible fluid.

Differential pressure devices, such as orifices, have long been used to measure the flowrates of fluids such as natural gas. In this method the measuring device comprises a conduit, which is usually circular in construction, the interior of which is sealed with a baffle plate having an orifice of known size and shape therein. The measurement of flowrate is accomplished by passing the fluid through the conduit and through the orifice. The pressure is measured on both the upstream and downstream sides of the baffle plate. Knowing both the pressure differential and the orifice size and geometry, the flowrate can be calculated using the orifice equation, which is well known in the art.

The major drawback to this method is that the orifice equation is dependent upon the size and shape of the orifice. If the orifice is different from that assumed by the equation, the resulting flowrate is inaccurate. In practice, the orifice increases in size and changes in shape as it ages due to wear from the passage of fluids. The usual way of assuring the accuracy of flowrate measurements is to change the baffle plate frequently to minimize variations in the size and shape of the orifice.

The major consequence of a change in the orifice size through wear is to indicate a smaller flowrate than actually exists. Thus if the orifice increases, the pressure differential will drop, even though the flowrate remains constant. In such industries as natural gas production and transmission small errors in measurement of the flowrate can result in large economic losses. These losses have been greatly magnified in recent years as the value of natural gas has increase manifold.

A further problem in using the standard orifice equation is that it assumes that there is no temperature differential across the orifice plate. This assumption is correct only for fluids that are relatively incompressible under normal conditions. For fluids such as gases the compressibility, and thus the temperature differential, cannot be ignored where highly accurate measurement is desired. Failure to recognize and take this effect into account has rendered flowrate measurements based upon the standard orifice equation significantly inaccurate.

OBJECTS AND SUMMARY OF THE INVENTION

It is therefore an object of the present invention to provide a method and apparatus for measuring the flowrate of relatively compressible fluids, having increased accuracy.

It is another object of the present invention to provide a method and apparatus for measuring the flowrate of relative compressible fluids that are independent of the type of flow restrictor used.

It is a further object of the present invention to provide a method and apparatus for measuring the flowrate of relatively compressible fluids that are not subject to natural degradation of the measuring device.

It is a still further object of the present invention to provide a method and apparatus for measuring the flowrate of relatively compressible fluids that do not ignore the temperature differential across the orifice or other flow restrictor device.

It is yet another object of the present invention to provide a method and apparatus for measuring the flowrate of relatively compressible fluids that do not ignore the compressibility thereof.

With this and other objects in view, the flowrate of a relatively compressible fluid is measured by measuring the pressure and temperature of the fluid on both the upstream and downstream sides of an impeding device and computing the flowrate of the fluid as a function of the differentials in pressure and temperature across the impeding device.

BRIEF DESCRIPTION OF THE DRAWING

The invention may be more fully understood by reading the following description in conjunction with the appended drawing.

DETAILED DESCRIPTION OF A PREFERRED EMBODIMENT

Figure 1:
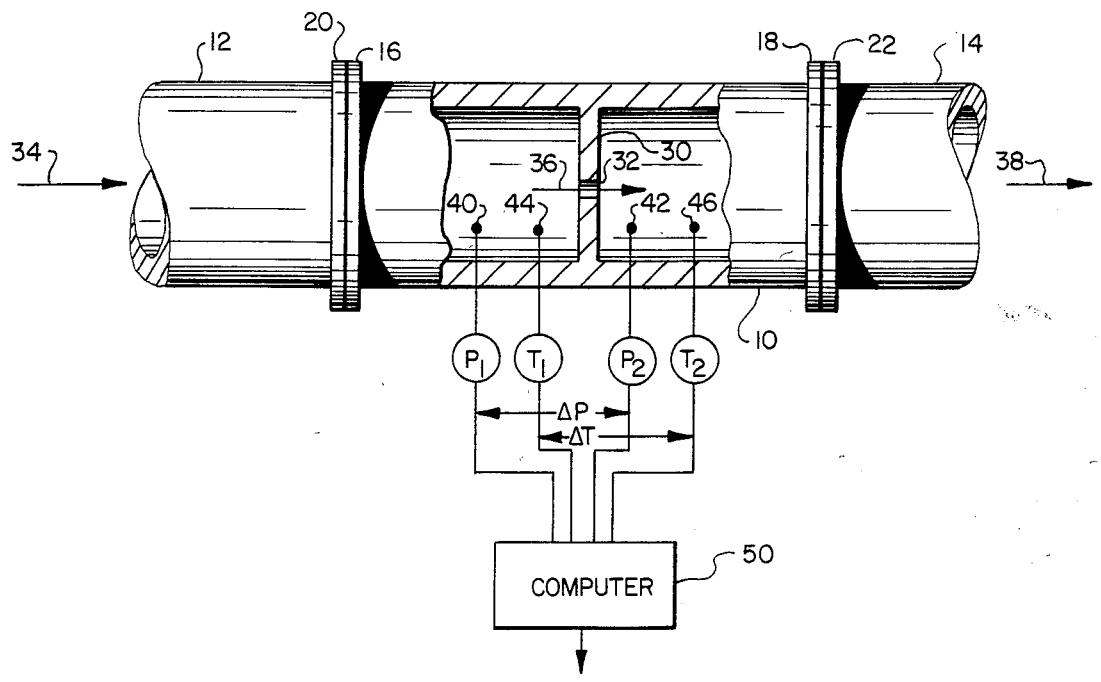
FIG. 1 is a somewhat diagramatic view of a conduit and associated sensors.

Referring to FIG. 1, a section of conduit 10 embodying the invention is shown in a somewhat diagramatic view. Conduit 10 is connected into a pipe line represented by pipe, or conduit, sections 12 and 14 by means of flanges 16 and 18. Flanges 16 and 18 are secured to flanges 20 and 22 on pipe sections 12 and 14, respectively, by bolts, or other suitable means (not shown).

Conduit 10 has positioned therein an orifice plate 30 having an orifice 32 therein. It should be understood that the use of an orifice is merely illustrative, and any suitable flow impedance device, such as a venturi or a critical nozzle, can be used without departing from the invention. The flow impedance might also comprise a decrease in the size of conduit 10 in the direction of fluid flow. The primary requirement is that the flow impedance provide a measurable temperature and pressure differential across itself. The flow of a fluid through the pipe line of FIG. 1 is illustrated by arrows 34, 36 and 38. Arrow 34 illustrates the entry of fluid through conduit section 12, and arrow 38 illustrates the exit of fluid from conduit section 14. Arrow 36 illustrates the passage of the fluid through orifice 32.

Conduit section 10 has inserted in the walls thereof by means of taps, or the like, pressure sensors, or probes, 40 and 42 and temperature sensors, or probes, 44 and 46. Pressure sensor 40 and temperature sensor 44 are positioned on the upstream side of orifice plate 30; and pressure sensor 42 and temperature 46 are positioned on the opposite, or downstream, side of orifice plate 30. As schematically indicated, sensor 40 produces a pressure $P_1$ and sensor 42 a pressure $P_2$. Similarly, sensor 44 measures a temperature $T_1$ and sensor 46 a temperature $T_2$. The difference between $P_1$ and $P_2$ is schematically indicated as $\Delta P$ and the difference between $T_1$ and $T_2$ as $\Delta T$. In practice, the $\Delta P$ and $\Delta T$ can be measured directly and the $P_2, T_2$ taps can be at the same location.

The detection of $\Delta P$ and $\Delta T$ are important to the present invention. As a consequence, sensors 40, 42, 44, and 46 must be positioned for optimum measurement of $P_1$, $P_2$, $T_1$, and $T_2$. Due to the relatively small difference between $T_1$ and $T_2$, efforts should be made to reduce the effects of the ambient temperature outside conduit 10. While insulating material might be placed around conduit 10, it is preferable to place sensors 44 and 46 sufficiently distant from the wall of conduit 10 that the temperature conductive effects of conduit 10 do not significantly affect the value of $T_1$ and $T_2$.

In order to accurately measure $P_1$ and $P_2$, sensors 40 and 42 should be positioned away from the boundary effects near the walls of conduit 10 and the swirl effect of fluid emanating from orifice 32. Consequently, both sensors 40 and 42 should be positioned near the center of conduit 10, and sensor 42 should be located sufficiently downstream of orifice 32 that minimum swirl or turbulence exists.

The values of $P_1$, $P_2$, $T_1$, and $T_2$ are transmitted to a computer, or other calculation apparatus 50, which determines the flowrate in accordance with the equation hereinafter developed in the following section on the theory of the invention.

THEORY OF THE INVENTION

The invention is based upon the discovery by the inventors that the temperature differential across orifice plate 30, or other similar flow impedance, should not be ignored for compressible fluids where highly accurate flowrate measurements and calculations are desired. The standard orifice equation does not require the measurement of the temperature differential since it assumes that the temperature differential is too small to be measured and thus has an inconsequential effect upon the flowrate calculation. This assumption continues to be true for relatively incompressible fluids such as water. However, for compressible fluids, such as gases, the applicants have discovered that the temperature differential, although small, has a significant effect upon the flowrate calculation and that under the proper circumstances the temperature differential can be maximized and thus measured.

Applicants have thus created an entirely new set of starting conditions for the flowrate calculation, which permits the use of a thermodynamic approach to the flowrate calculation. The standard orifice equation is based upon a fluid mechanics approach. This new approach permits the flowrate calculations to be based only upon conditions before and after the flow impedance and thus does not depend upon the type or condition of the flow restriction. Consequently, flowrates calculated according to the method of the present invention are more accurate in the absolute sense and do not decrease in accuracy as the flow restriction degrades, such as when an orifice erodes.

The method of the present invention requires the use of a new flowrate equation. The starting point for deriving such an equation for the starting conditions made available by the present invention is the First Law of Thermodynamics. In general terms, this expression is:

$$\Delta[u+ke+pe]_{sys} = \Sigma q + \Sigma w + \Sigma[h+ke+pe]_{mt} \quad (1)$$

where u is internal energy, ke is kinetic energy, pe is potential energy, q is energy transferred as heat, w is energy transferred as work, and h is enthalpy. All properties are per unit mass. The delta signs represent "in minus out." Subscripts sys and mt denote "system" and "mass transfer" respectively. For the invention, the usual assumptions are:

(1) steady state flow
(2) adiabatic flow
(3) no work
(4) horizontal flow (this assumption is not necessary, but simplifies the algebra)
(5) flat profile.

Applying these assumptions to equation 1 and taking condition 1 to be upstream and condition 2 to be downstream produces:

$$h_2 - h_1 + \frac{\dot{z}_2^2 - \dot{z}_1^2}{2g_c} = 0 \quad (2)$$

where z is velocity and $g_c$ is the mass/force conversion factor. The mass flowrate, $\dot{m}$, in steady state flow is:

$$\dot{m} = \dot{z}A/v \quad (3)$$

where A is the cross-sectional area of the conduit and v is the volume per mass of the fluid.

The kinetic energy term in Equation 2 becomes, in terms of Equation 3, $$\frac{\dot{z}_2^2 - \dot{z}_1^2}{2g_c} = \frac{\dot{z}_1^2}{2g_c}\left[\frac{\dot{z}_2^2}{\dot{z}_1^2} - 1\right] = \frac{\dot{m}^2 v_1^2}{2g_c A_1^2}\left[\frac{v_2^2 A_1^2}{v_1^2 A_2^2} - 1\right] \quad (4)$$

or, assuming circular conduits and inserting the equation of state $$\frac{\dot{z}_2^2 - \dot{z}_1^2}{2g_c} = \frac{8}{g_c}\left[\frac{\dot{m}Z_1 RT_1}{\pi D_1^2 MP_1}\right]^2 \left\{\left[\frac{Z_2 T_2 P_1}{Z_1 T_1 P_2}\right]^2\left[\frac{D_1}{D_2}\right]^4 - 1\right\} = \frac{8}{g_c}\left[\frac{\dot{m}Z_1 RT_1}{D_1^2 MP_1}\right]^2 [-\psi] \quad (5)$$

where Z is the compressibility factor, M is the molar mass, R is the gas constant, T is temperature, P is pressure and D is diameter. For convenience of notation we define $$\psi = 1 - \left[\frac{Z_2 T_2 P_1}{Z_1 T_1 P_2}\right]^2\left[\frac{D_1}{D_2}\right]^4 = \psi(T,P,D) \quad (6)$$

noting that $\psi$ is a function of the temperature and pressure of the fluid at points 1 and 2, and of the geometry also at points 1 and 2. Two equivalent expressions for the enthalpy difference in Equation 2 are:

$$h_2 - h_1 = \int_{s_1}^{s_2} T\,ds + \int_{P_1}^{P_2} v\,dP \quad (7)$$

$$h_2 - h_1 = \frac{R}{M}\left\{\int_{T_2O}^{P_2}\left[\frac{\partial Z}{\partial 1/T}\right]_{P,x}\frac{dP}{P} - \int_{T_1O}^{P_1}\left[\frac{\partial Z}{\partial 1/T}\right]_{P,x}\frac{dP}{P} + \int_{T_1}^{T_2}\frac{C_p^{id}}{R}dT\right\} \quad (8)$$

where s is entropy per mass, x is composition, and $C_p^{id}$ is ideal gas specific heat per mole. Substitution of Equation 5 and either Equation 6 or Equation 7 into Equation 2 provides an expression for m.

Equations 5, 7, and 2 form the basis for the usual orifice expressions after utilizing further definitions. One definition is $$_1f_2 = \int_{s_1}^{s_2} T ds - {}_1q_2 = \dot{z}_1{}^2 \phi_1(\beta, N_R, \ldots)/2g_c \quad (9)$$

where $_1f_2$ is the dissipative (friction) term, $\phi$ is an empirical function of geometry, flow characteristics, fluid properties and probably other terms. The arguments listed are $\beta = d/D$ where d is the orifice diameter and $N_R$, the Reynolds number.

The $_1q_2$ term is energy transferred as heat along path $1 \rightarrow 2$ (assumed zero in this derivation). Thus, Equation 6 becomes $$h_2 - h_1 = {}_1f_2 + \int_{P_1}^{P_2} v dP = \dot{z}_1{}^2 \phi_1/2g_c + \int_{P_1}^{P_2} v dP \quad (10)$$

The integral remaining in Equation 9 is particularly vexing. Although the enthalpy is a path independent function, Equation 9 forces the path to be the actual, physical path through the orifice. Because this path is irreversible, calculation of the integral is not tractable, necessitating an additional definition.

$$\int_{P_1}^{P_2} v dP = X_1{}^2 v_1 [P_2 - P_1] \quad (11)$$

where X is an empirical factor which must account simultaneously for irreversibility (friction) and for the equation of state effect of fluid expansion. Separating the two effects gives $$X = FY \quad (12)$$

where F is the dissipative part and Y is the usual expansion factor. This approach produces an expression for mass flowrate $$\dot{m} = \left[\frac{\pi^2 g_c}{8R}\right]^{\frac{1}{2}} \Phi_1 Y_1 d^2 \left(\frac{MP_1}{Z_1 T_1}[P_2 - P_1]\right)^{\frac{1}{2}} \quad (13)$$

where $\Phi$ is a collection of dissipative and expansion effects:

$$\phi_1 = \frac{F_1}{\beta_1{}^2[\Psi - \phi_1]^{\frac{1}{2}}} = \phi_1(\beta, N_R, T, P, x, \ldots) \quad (14)$$

For compressible fluids, the ZTP ratio term in $\psi$ is not unity. Also because $\psi$ and $\phi_1$ appear in an additive manner, the Y term cannot account for the expansion effect in $\psi$. Equation 13 corresponds formally with the usual orifice expressions such as appear in Hall, K. R.; Eubank, P. T.; Hoste, J. C.; Derivation of Orifice Equation Reevaluated; *Oil and Gas J.*, 81, 66 (July 11, 1983), Miller, R. W.; *Flow Measurement Engineering Handbook;* McGraw-Hill; New York (1983), AGA Report Number 3, and numerous texts on fluid mechanics.

Equations 5, 8, and 2 produce a new performance equation $$\dot{m} = \frac{\pi D_1{}^2 P_1}{Z_1 T_1} \left[\frac{Mg_c}{8R\psi} \left\{\int_{T_20}^{P_2} \left[\frac{\partial Z}{\partial 1/T}\right]_{P,x} \frac{dP}{P} - \int_{T_10}^{P_1} \left[\frac{\partial Z}{\partial 1/T}\right]_{P,x} \frac{dP}{P} + \int_{T_1}^{T_2} \frac{C_p^{id}}{R} dT\right\}\right]^{\frac{1}{2}} \quad (15)$$

Figure 2:
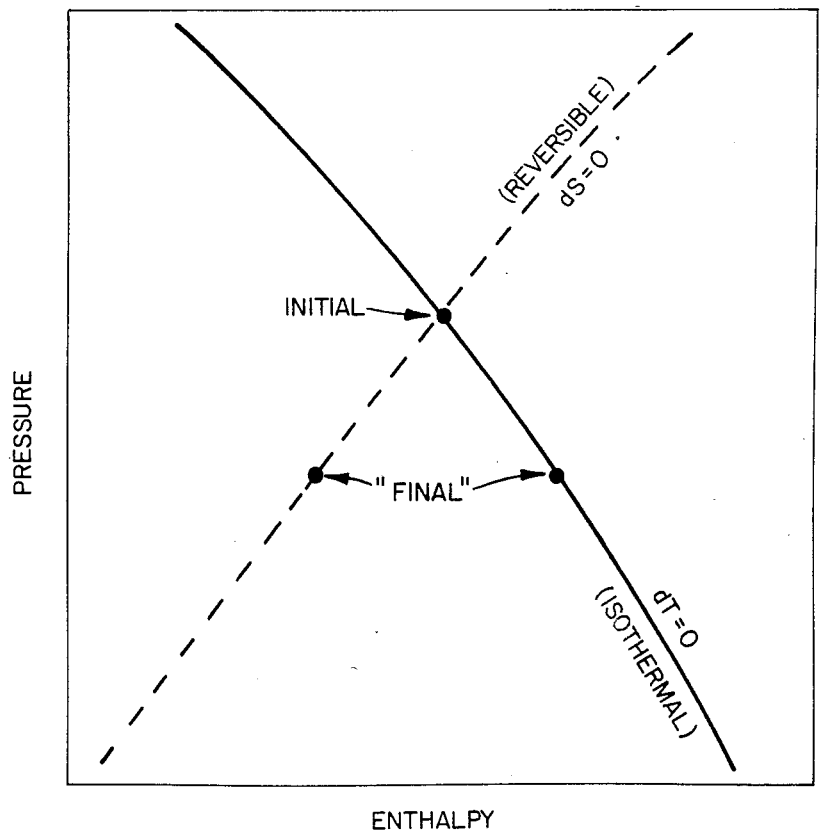
FIG. 2 is a diagram of pressure vs. enthalpy related to the derivation of the equation associated with the present invention computing apparatus in accordance with the present invention.

The most striking feature of this equation is that it has no explicit dissipative term. In fact, the entire effect of the orifice appears in the pressure and temperature changes. The temperature must change for highly compressible fluids as is obvious from FIG. 2. For highly compressible fluids with $D_1 = D_2$, the $\psi$ term is negative, thus the term in braces in Equation 14 must also be negative. Of course, the term in braces is directly proportional to $h_2 - h_1$. In FIG. 2., the solid line is isothermal. When the pressure drops isothermally, the enthalpy increases and the square root in Equation 15 becomes imaginary. The dashed line in FIG. 2 is reversible (isentropic). When pressure drops reversibly, the enthalpy decreases thus satisfying the first law constraint. An orifice is clearly not reversible, but it is obviously more nearly reversible than isothermal for compressible fluids.

Further development provides insight into the implications of the new expression. For purpose of this discussion, define:

$$K = \frac{\pi D_1{}^2 P_1}{Z_1 T_1} \left[\frac{Mg_c}{8R}\right]^{\frac{1}{2}} \quad (16)$$

$$\delta_P = [P_2 - P_1]/P_1 \quad (17)$$

$$\delta_T = [T_2 - T_1]/T_1 \quad (18)$$

$$\delta_Z = [Z_2 - Z_1]/Z_1 \quad (19)$$

$$I_P \delta_P = \int_{T_2O}^{P_2} \left[\frac{\partial Z}{\partial 1/T}\right]_{P,x} \frac{dP}{P} - \int_{T_1O}^{P_1} \left[\frac{\partial Z}{\partial 1/T}\right]_{P,x} \frac{dP}{P} \quad (20)$$

$$I^{id} \delta_T = \int_{T_1}^{T_2} \frac{C_p^{id}}{R} dT \quad (21)$$

Using these definitions and assuming that $\delta_P$ and $\delta_T$ are small (as is the usual case), Equation 14 becomes $$\dot{m} = K \left\{\frac{I_P \delta_P + I^{id} \delta_T}{1 - D_r{}^4 \left\{1 - 2\left[\left\{D_r{}^{-4} - \left[\frac{\partial \ln Z}{\partial \ln P}\right]_{T,x}\right\} \delta_P - \left\{1 + \left[\frac{\partial \ln Z}{\partial \ln T}\right]_{P,x}\right\} \delta_T\right]\right\}}\right\}^{\frac{1}{2}} \quad (22)$$

Irreversible effects in Equation 21 all appear in the observables $\delta_P$ and $\delta_T$ because all other term are physical geometry or fluid properties. Therefore, both $\delta_P$ and $\delta_T$ *must* be measured. However, having measured $\delta_P$ and $\delta_T$, it is not necessary to correlate dissipative effects by establishing a discharge coefficient.

The effect of the temperature change is significant for highly compressible fluids. In cases representing common gas flow measurements, the temperature change effect can be double the pressure change effect. In such cases, the magnitudes are: $\delta_p \sim 0.005$ and $\delta_T \sim 0.0005$.

Finally, Equations 13 and 15 are obviously identical and provide insight into the problem of correlating the discharge coefficient. Equating the two expressions produces $$\Phi_1 \beta_1{}^2 Y_1 = \left\{ \frac{\int_{T_2 0}^{P_2} \left[\frac{\partial Z}{\partial 1/T}\right]_{P,x} \frac{dP}{P} - \int_{T_1 0}^{P_1} \left[\frac{\partial Z}{\partial 1/T}\right]_{P,x} \frac{dP}{P} + \int_{T_1}^{T_2} \frac{C_p{}^{id}}{R} dT}{Z_1 T_1 \psi \delta_P} \right\}^{\frac{1}{2}} \quad (23)$$

Problems with past correlations for discharge coefficients include: ignoring the (dominant) temperature effect, assuming that $Y_1$ can account for all expansion effects, and trying to correlate friction.

While particular embodiments of the invention have been shown and described, it is obvious that minor changes and modifications may be made therein without departing from the time scope and spirit of the invention. It is the intention in the appended claims to cover all such changes and modifications.

What is claimed is:

1. Apparatus for determining the flowrate of a stream of compressible fluid comprising:
    a conduit for carrying the fluid;
    means in the conduit for impeding the flow of the fluid through said conduit;
    means for measuring the pressure of the fluid on the upstream and downstream sides of the impeding means;
    means for measuring the temperature of the fluid on both the upstream and downstream sides of said impeding means; and
    means for computing the flowrate of said fluid as a function of the differentials in pressure and temperature as measured on both the upstream and downstream sides of said impeding means.

2. Apparatus in accordance with claim 1 wherein the flowrate is computed in accordance with the following formula:

$$\dot{m} = \frac{\pi D_1{}^2 P_1}{Z_1 T_1} \left[ \frac{M g_c}{8 R \psi} \left\{ \int_{T_2 0}^{P_2} \left[\frac{\partial Z}{\partial 1/T}\right]_{P,x} \frac{dP}{P} - \int_{T_1 0}^{P_1} \left[\frac{\partial Z}{\partial 1/T}\right]_{P,x} \frac{dP}{P} + \int_{T_1}^{T_2} \frac{C_p{}^{id}}{R} dT \right\} \right]^{\frac{1}{2}} \quad (15)$$

where
P means Pressure
T means Temperature
R means Gas Constant
Z means Compressibility Factor
D means Diameter
M means Molar Mass
m means Mass Flowrate
$C_p{}^{id}$ means Ideal Gas Specific Heat per Mole
$\psi$ means f(temperature and Pressure of Fluid Points 1 and 2, and of the geometry also at points 1 and 2)
$g_c$ means Mass/Force Conversion Factor.

3. Apparatus in accordance with claim 2 wherein said impeding means is adapted to maximize the temperature differential measured on both the upstream and downstream sides of said impeding means.

4. Apparatus in accordance with claim 3 wherein said temperature measuring means are positioned relatively distant from the walls of said conduit.

5. Apparatus in accordance with claim 4 wherein said pressure measuring means are positioned relatively distant from said impeding means.

6. Apparatus in accordance with claim 5 wherein said impeding means comprises a plate having an orifice therein.

7. Apparatus in accordance with claim 6 wherein said impeding means comprises a change in diameter of said conduit.

8. Method for determining the flowrate of a stream of a compressible fluid in a conduit having an impedance device therein, comprising the steps of:
    measuring the pressure of the fluid on the upstream side of the impedance device;
    measuring the pressure of said fluid on the downstream side of said impedance device;
    measuring the temperature of said fluid on said upstream side of said impedance device;
    measuring the temperature of said fluid on said downstream side of said impedance device;
    the preceding four steps being in any order;
    determining the difference in pressure between said upstream and downstream sides of said impedance device;
    determining the difference in temperature between said upstream and said downstream sides of said impedance device;
    the preceding two steps being in any order; and
    computing the flowrate of said fluid as a function of said differences in pressure and temperature.

9. Method in accordance with claim 8 wherein the first four measuring steps are substantially contemporaneous.

10. Method in accordance with claim 9 wherein said computing step is performed in accordance with the following equation:

$$\dot{m} = \frac{\pi D_1{}^2 P_1}{Z_1 T_1} \left[ \frac{M g_c}{8 R \psi} \left\{ \int_{T_2 0}^{P_2} \left[\frac{\partial Z}{\partial 1/T}\right]_{P,x} \frac{dP}{P} - \int_{T_1 0}^{P_1} \left[\frac{\partial Z}{\partial 1/T}\right]_{P,x} \frac{dP}{P} + \int_{T_1}^{T_2} \frac{C_p{}^{id}}{R} dT \right\} \right]^{\frac{1}{2}} \quad (15)$$

where
P means Pressure
T means Temperature

R means Gas Constant
Z means Compressibility Factor
D means Diameter
M means Molar Mass
m means Mass Flowrate
$C_p^{id}$ means Ideal Gas Specific Heat per Mole
$\psi$ means f(temperature and Pressure of Fluid Points 1 and 2, and of the geometry also at points 1 and 2)
$g_c$ means Mass/Force Conversion Factor.

11. Apparatus for determining the flowrate of a stream of compressible fluid, comprising:
 a conduit for carrying the fluid;
 a plate in said conduit having orifice therein, whereby the fluid flow may be impeded to create pressure and temperature differential thereacross;
 a first pressure sensor in said conduit on the upstream side of the plate;
 a second pressure sensor in said conduit on the downstream side of said plate;
 a first temperature sensor in said conduit on said upstream side of said plate;
 a second temperature sensor in said conduit on said downstream side of said plate; and
 means in communication with said first and second temperature sensors for computing the flowrate of said stream of fluid in accordance with the following formula:

$$\dot{m} = \frac{\pi D_1^2 P_1}{Z_1 T_1}\left[\frac{Mg_c}{8R\psi}\left\{\int_{T_20}^{P_2}\left[\frac{\partial Z}{\partial 1/T}\right]_{P,x}\frac{dP}{P} - \int_{T_10}^{P_1}\left[\frac{\partial Z}{\partial 1/T}\right]_{P,x}\frac{dP}{P} + \int_{T_1}^{T_2}\frac{C_p^{id}}{R}dT\right\}\right]^{\frac{1}{2}} \quad (15)$$

where
 P means Pressure
 T means Temperature
 R means Gas Constant
 Z means Compressibility Factor
 D means Diameter
 M means Molar Mass
 m means Mass Flowrate
 $C_p^{id}$ means Ideal Gas Specific Heat per Mole
 $\psi$ means f(temperature and Pressure of Fluid Points 1 and 2, and of the geometry also at points 1 and 2)
 $g_c$ means Mass/Force Conversion Factor.

* * * * *